US006964622B1

(12) United States Patent
Dewanjee

(10) Patent No.: US 6,964,622 B1
(45) Date of Patent: Nov. 15, 2005

(54) GOLF BALL WITH METAL CORE

(75) Inventor: Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 10/904,067

(22) Filed: Oct. 21, 2004

(51) Int. Cl.[7] .............................................. A63B 37/06
(52) U.S. Cl. ...................................................... 473/375
(58) Field of Search ................................. 473/378, 375

(56) References Cited

U.S. PATENT DOCUMENTS

| 6,309,312 | B1 * | 10/2001 | Sullivan et al. .............. 473/375 |
| 6,653,382 | B1 * | 11/2003 | Statz et al. .................. 524/400 |
| 6,705,957 | B2 * | 3/2004 | Owens et al. ................ 473/372 |
| 2004/0204266 | A1 * | 10/2004 | Owens et al. ................ 473/369 |

* cited by examiner

*Primary Examiner*—Raeann Gorden
(74) *Attorney, Agent, or Firm*—Michael A. Catania; Elaine H. Lo

(57) ABSTRACT

The present invention is a golf ball (10) with a core (12) and a cover layer (14). The core is preferably a metal wall (15) defining a hollow space (17). The cover layer (14) is preferably composed of a highly neutralized terpolymer and a fatty acid based moiety.

6 Claims, 1 Drawing Sheet

GOLF BALL WITH METAL CORE

BACKGROUND OF THE INVENTION

1. Field of the Invention

The present invention relates to a golf ball. More specifically, the present invention relates to a golf ball with a hollow metal core.

2. Description of the Related Art

The Rules of Golf, as set forth by the United States Golf Association ("USGA" and the Royal and Ancient Golf Club of Saint Andrews, have placed controls on the construction and performance of golf balls. The golf ball rules require that the golf ball have a diameter no less than 1.68 inches (42.67 mm), a weight no more than 1.620 ounces avoirdupois (45.93 g), spherical symmetry, an overall distance no greater than 296.8 yards (the limit is 280 yards, or 256 m, plus a six percent tolerance for the total distance of 296.8 yards), and an initial velocity no greater than 255.0 feet per second (the limit is 250 feet or 76.2 m, per second with a two percent maximum tolerance that allows for an initial velocity of 255 feet per second) measured on a USGA approved apparatus.

The initial velocity test is comprised of a large 200 pound wheel that rotates around a central axis at a rate of 143.8 feet per second (striker tangential velocity) and strikes a stationary golf ball resting on a tee. The wheel has a flat plate that protrudes during its final revolution prior to impact with the golf ball. The ball's velocity is then measured via light gates as it travels approximately six feet through an enclosed tunnel. Balls are kept in an incubator at a constant temperature of 23 degrees Celsius for at least three hours before they are tested for initial velocity performance. To test for initial velocity, balls are placed on a tee and hit with the metal striker described above. Twenty-four balls of a particular type make up one test. Each ball is hit with the spinning wheel a total of four times. The highest and lowest recorded velocities are eliminated and the remaining two velocities are averaged to determine the ball speed for that specific ball. The individual speeds of the 24 balls in the group are then averaged, and that is considered the mean initial velocity (IV) of the group for the test.

For USGA conformance purposes, a ball with a mean initial velocity of less than 255.0 feet per second is considered conforming to the USGA Rule of Golf and can be played in sanctioned events. For reference to USGA Wheel Test see USGA web-site at www.usga.com, or reference U.S. Pat. No. 5,682,230 for further information.

Generally speaking, the USGA IV test is designed to be a consistent measurement tool capable of regulating the speed (and ultimately distance) of golf balls. It is commonly known in the industry that golf ball manufacturers perform a simpler test on prototype golf balls and then attempt to correlate the results to the USGA Wheel Test. One type of correlation test is the Coefficient of Restitution ("COR" test, which consists of firing a golf ball from a cannon into a fixed plate and taking the ratio of outgoing velocity to incoming velocity.

The Coefficient of Restitution is the ratio of the velocity of separation ($V_{out1}-V_{out2}$) to the velocity of approach ($V_{in1}-V_{in2}$), where $COR=(V_{out1}-V_{out2})/(V_{in1}-V_{in2})$. The value of COR will depend on the shape and material properties of the colliding bodies. In elastic impact, the COR is unity and there is no energy loss. A COR of zero indicates perfectly inelastic or plastic impact, where there is no separation of the bodies after collision and the energy loss is a maximum. In oblique impact, the COR applies only to those components of velocity along the line of impact or normal to the plane of impact. The coefficient of restitution between two materials can be measured by making one body many times larger than the other so that $m_2$ (mass of larger body) is infinitely large in comparison to $m_1$ (mass of the smaller body). The velocity of $m_2$ is unchanged for all practical purposes during impact and $$COR=V_{Out}/V_{in}$$

Most recently, DuPont Chemicals has developed a new material sold under the HPF tradename, which is composed of copolymers or terpolymers with a fatty acid salt. Aspects of the HPF™ material are discussed in U.S. Pat. No. 6,653,382. The HPF™ material increases the coefficient of restitution of the golf ball.

It would be preferred to use the HPF material for a one-piece golf ball. However, the specific gravity of HPF is such that the mass of the golf ball would not be sufficient. Additionally, if tungsten is added to a mixture of HPF material, the material becomes black in color and is difficult to paint.

BRIEF SUMMARY OF THE INVENTION

The present invention provides a solution to using HPF material for the majority of a golf ball without using tungsten as a filler. The present invention provides a metal hollow core to increase the mass of the golf ball while injection molding a layer of HPF material over the metal hollow core to create a golf ball with sufficient mass and good COR.

One aspect of the present invention is a golf ball with a metal hollow core and a layer composed of a disposed over the metal hollow core.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
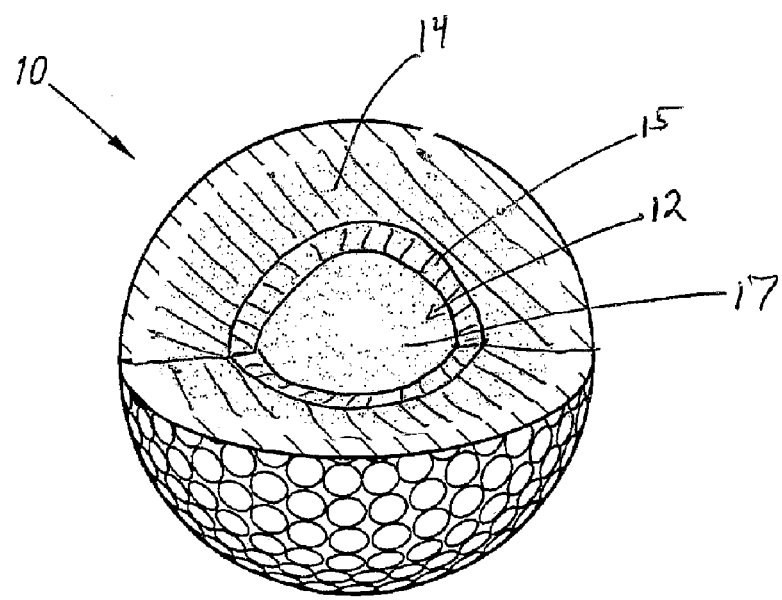
FIG. 1 is a cross-sectional view of a preferred embodiment of a golf ball.
Figure 2:
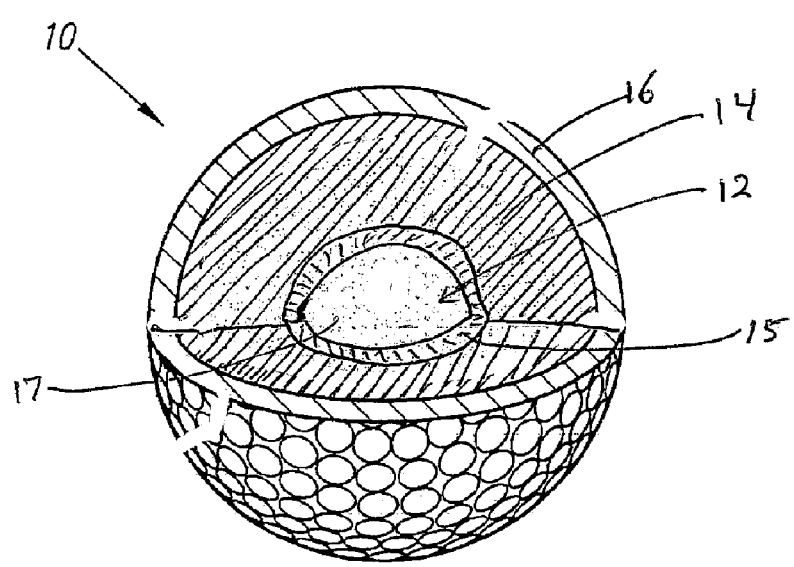
FIG. 2 is a cross-sectional view of an alternative embodiment of a golf ball.

As shown in FIG. 1, a golf ball of the present invention is generally designated 10. The golf ball 10 of FIG. 1 preferably has a metal hollow core 12 and cover layer 14 composed of a highly neutralized copolymer or terpolymer having a fatty acid based moiety.

The surface geometry of the golf ball 10 is preferably a conventional dimple pattern such as disclosed in U.S. Pat. No. 6,224,499 for a Golf Ball With Multiple Sets Of Dimples, which pertinent parts are hereby incorporated by reference. Alternatively, the surface geometry of the golf ball 10 has a non-dimple surface geometry such as disclosed in U.S. Pat. No. 6,290,615, filed on Nov. 18, 1999 for A Golf Ball Having A Tubular Lattice Pattern, which pertinent parts are hereby incorporated by reference.

The golf ball 10 is preferably finished with either a very thin (microns in thickness) single top coating, or is painted with one or more base coats of paint, typically white, before application of a clear coat. The material of the cover 14 may be doped for coloring, as is well known in the art.

As mentioned above, the core 12 of the golf ball 10 is preferably composed of a hollow metal sphere. The wall 15 of the sphere preferably has a thickness ranging from 0.100 inch to 0.250 inch. The wall 15 defines a hollow space 17. The wall is composed of a metal material having a density ranging from 4.50 grams per cubic centimeter ("g/cc") to 14.0 g/cc, more preferably from 7.0 g/cc to 10.0 g/cc, and most preferably approximately 8.0 g/cc. The metal material is preferably selected from the group consisting of titanium, titanium alloys, iron-based alloys, nickel-based alloys, nickel-tungsten based alloys, brass, copper-based alloys and nickel-chromium-tungsten based alloys. A preferred material is stainless steel.

The core 12 preferably has a diameter ranging from 0.50 inch to 0.750 inch. The hollow space 17 is preferably filled with air or a gaseous medium. The core 12 preferably has a mass ranging from 20 grams to 35 grams, more preferably from 25 grams to 30 grams, and most preferably approximately 27 grams. The metal wall 15 is preferably sand blasted and cleaned for better adhesion to the cover material. Alternatively, a primer coat, such as CHEMLOK, is applied to the exterior surface of the metal wall 15 to increase adhesion with the cover material.

The cover layer 14 is preferably composed of a highly neutralized copolymer or terpolymer having a fatty acid based moiety. Such materials are available from DuPont Chemicals under the HPF tradename. The HPF materials are thermoplastic polymers which consists essentially of at least one E/X/Y copolymer where E is ethylene, X is a $C_3$ to $C_8$ $\alpha$, $\beta$ ethylenically unsaturated carboxylic acid, and Y is a softening co-monomer of the E/X/Y copolymer. The X component is preferably about 3–30 wt. % of the E/X/Y copolymer. The Y component is about 0–30 wt. % of the E/X/Y copolymer. The HPF material also includes at least one aliphatic, mono-functional organic acid having less than 36 carbon atoms or salts thereof. The aliphatic, mono-functional organic acid is present in the range of about 25 to about 150 parts per hundred parts by weight of the E/X/Y copolymer. Further, greater than 90% of all the acid of the E/X/Y copolymer and the aliphatic, mono-functional organic acid are neutralized with a cation source.

The aliphatic, mono-functional organic acid or fatty-acid based moiety is preferably magnesium stearate, magnesium oleate, calcium stearate, zinc stearate or lithium stearate. However, those skilled in the pertinent art will recognize that other fatty-acid based moieties may be utilized without departing from the scope and spirit of the present invention.

One preferred HPF material for the cover layer 14 has ethylene, acrylic acid, and n-butyl acrylate, with approximately 100% of the acid groups neutralized with metal ions and at least 5 parts per hundred of either magnesium stearate or magnesium oleate. The three components (E/X/Y) of the copolymer or terpolymer are present in the following amounts: from about 60 to about 90% ethylene, from about 8 to about 20% by weight of the $\alpha$, $\beta$-unsaturated carboxylic acid, and from 0% to about 25% of the n-alkyl acrylate. The copolymer or terpolymer also contains an amount of a fatty acid based moiety. The fatty acid based moiety preferably comprises magnesium oleate.

Another preferred material for the cover layer 14 is HPF 1000, which is a copolymer of ethylene and acrylic acid. 100% of the carboxylic acid groups of this material are neutralized with magnesium ions. The material has a Shore D hardness of 52. The copolymer also contains a fatty-acid based moiety.

Another preferred material for the cover layer 14 is HPF SEP 1313-4, which is a copolymer of approximately 81% by weight ethylene and approximately 19% by weight acrylic acid. 100% of the carboxylic acid groups of this material are neutralized with magnesium ions. The copolymer also contains at least 5 parts per hundred of magnesium oleate.

Another preferred material for the cover layer is HPF SEP 1313-3, which is a copolymer of approximately 85% by weight ethylene and approximately 15% by weight acrylic acid. 100% of the acid groups of this material are neutralized with magnesium ions. The copolymer also contains at least 5 parts per hundred of magnesium oleate.

Another preferred material for the cover layer is HPF AD1027, which is a copolymer of approximately 88% by weight ethylene and approximately 12% by weight acrylic acid. 100% of the acid groups of this material are neutralized with magnesium ions. The copolymer also contains at least 5 parts per hundred of magnesium oleate.

Another preferred material for the cover layer is HPF RX-85, which is a copolymer of approximately 88% ethylene and approximately 12% acrylic acid. 100% of the acid groups of this material are neutralized with magnesium ions. The copolymer also contains a magnesium oleate.

Other HPF materials include HPF AD1027, HPF SEP1199, and HPF SEP 1252, all which are available from DuPont Chemicals.

As used herein, the term "PGA compression" is defined as follows:

$$PGA\ compression\ value = 180 - Riehle\ compression\ value$$

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85. The golf ball 10 preferably has a PGA compression ranging from 85 to 110 points on this scale.

The Shore D hardness of the materials of the cover layer 14 is preferably between 45 to 55, as measured according to ASTM D-2290, except the measurement is performed on the curved surface of the cover layer 14, and using an Instron Shore D Hardness measurement device.

The cover layer 14 preferably has a thickness of between 0.450 inch to 0.600 inch, and most preferably from 0.465 inch to 0.59 inch. The cover layer 14 is preferably injection molded over the core 12.

The overall diameter of the golf ball is approximately 1.68 inches, and the weight is approximately 45.5 grams. Those skilled in the pertinent art will recognize that a golf ball 10 with a larger diameter such as 1.70 inches is within the scope and spirit of the present invention. The preferred golf ball 10 has a COR of approximately 0.8152 at 143 feet per second, and an initial velocity between 250 feet per second to 255 feet per second under USGA initial velocity conditions, such as disclosed in U.S. Pat. No. 6,595,872, which pertinent parts are hereby incorporated by reference.

In an alternative embodiment, a second cover layer 16 is disposed over the cover layer 14. The second layer 16 is preferably composed of a polyurethane material. Preferably, the polyurethane material is a thermosetting polyurethane material. An example of such thermosetting polyurethane materials are disclosed in U.S. Pat. No. 6,190,268, U.S. Pat. No. 6,592,472, U.S. Pat. No. 6,762,273, and U.S. patent application Ser. No. 10/604,241, which pertinent parts are hereby incorporated by reference. In such an alternative embodiment, the second layer 16 preferably has a thickness ranging from 0.010 inch to 0.035 inch. The dimensions of the core 12 are similar to those disclosed in the preferred embodiment in reference to FIG. 1, however, the second layer 16 is preferably substituted for a portion of the cover layer 14, resulting in a cover layer 14 thickness range of 0.415 inch to 0.590 inch, and most preferably from 0.430 inch to 0.58 inch. The second layer 16 is preferably cast over the cover layer 14. Alternatively, the second layer 16 is reaction injection molded over the cover layer 16.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A golf ball comprising:

a core having a diameter of 0.50 inch to 0.750 inch, the core having a metal wall with a thickness of 0.100 inch to 0.250 inch which defines a hollow interior;

a cover layer disposed over the core, the cover layer having a thickness ranging from 0.415 inch to 0.590 inch, the cover layer having a Shore D hardness ranging 45 to 55, the cover layer composed of a the thermoplastic polymer consists essentially of at least one E/X/Y copolymer where E is ethylene, X is a $C_3$ to $C_8$ $\alpha$, $\beta$ ethylenically unsaturated carboxylic acid, and Y is a softening co-monomer of the E/X/Y copolymer, wherein X is about 3–30 wt. % of the E/X/Y copolymer or partially neutralized ionomers thereof, and Y is about 0–30 wt. % of the E/X/Y copolymer; and at least one aliphatic, mono-functional organic acid having less than 36 carbon atoms or salts thereof being present in the range of about 25 to about 150 parts per hundred parts by weight of the E/X/Y copolymer, wherein greater than 90% of all the acid of the E/X/Y copolymer and the aliphatic, mono-functional organic acid is neutralized with a cation source; and a second cover layer disposed over the cover layer, the second cover layer composed of a polyurethane material and having a thickness ranging from 0.010 inch to 0.035 inch;

wherein the golf ball has PGA compression ranging from 85 to 110, and the golf ball has a mass ranging from 44 grams to 46 grams.

2. The golf ball according to claim 1 wherein the metal wall is composed of a stainless steel.

3. The golf ball according to claim 1 further comprising an aerodynamic surface geometry on a surface of the cover layer.

4. The golf ball according to claim 1 wherein the golf ball has a diameter of 1.68 inches to 1.70 inches.

5. The golf ball according to claim 1 wherein the polyurethane is a thermosetting polyurethane.

6. The golf ball according to claim 1 wherein the polyurethane is a reaction injection molded polyurethane.

* * * * *